Nov. 28, 1967  C. JOHNSON  3,354,710
FORCE MEASURING INSTRUMENT
Filed Oct. 19, 1965  7 Sheets-Sheet 1
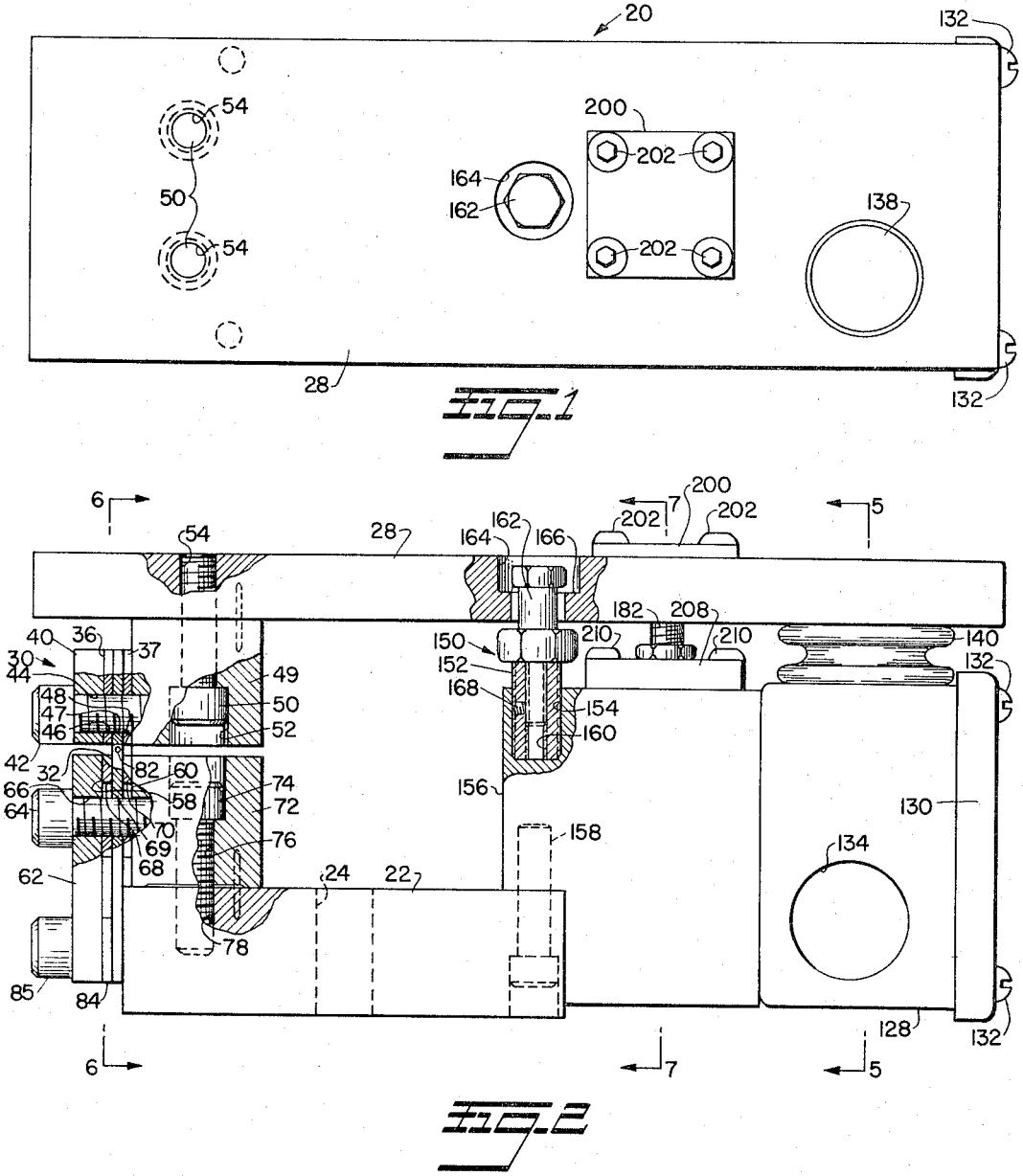
INVENTOR
CLARENCE JOHNSON
Strauch, Nolan, Neale,
Nies & Bronaugh
ATTORNEYS

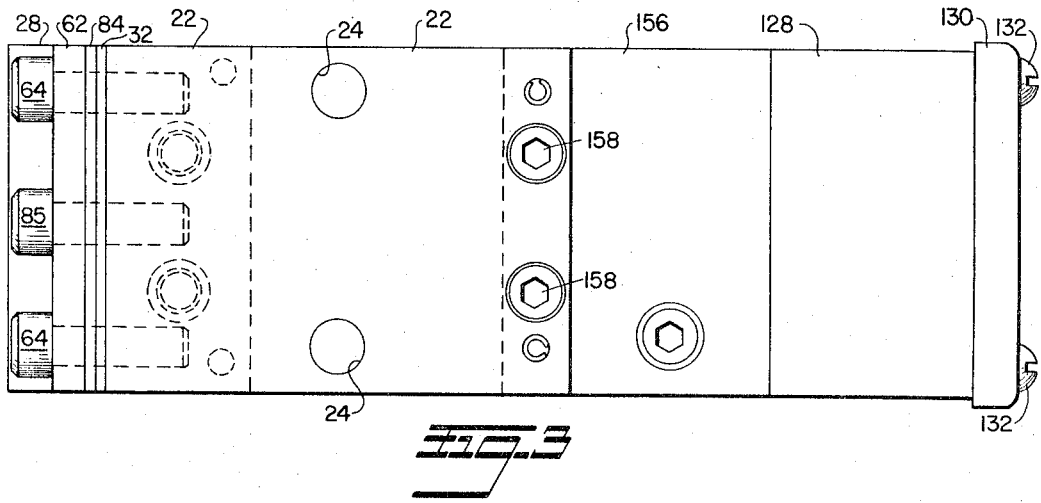
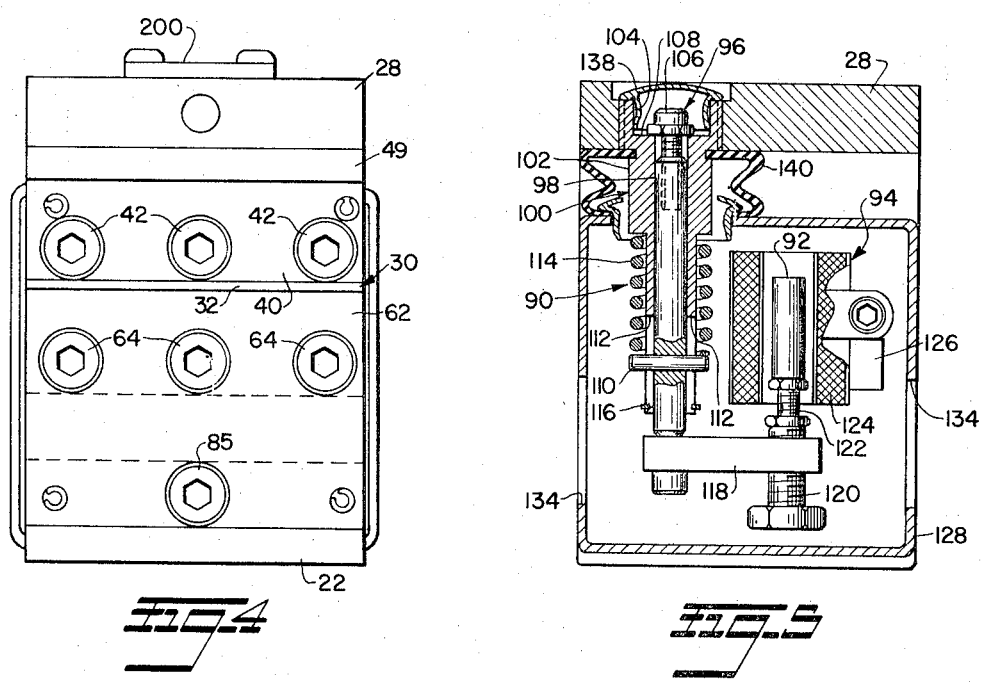

Nov. 28, 1967  C. JOHNSON  3,354,710
FORCE MEASURING INSTRUMENT
Filed Oct. 19, 1965  7 Sheets-Sheet 3
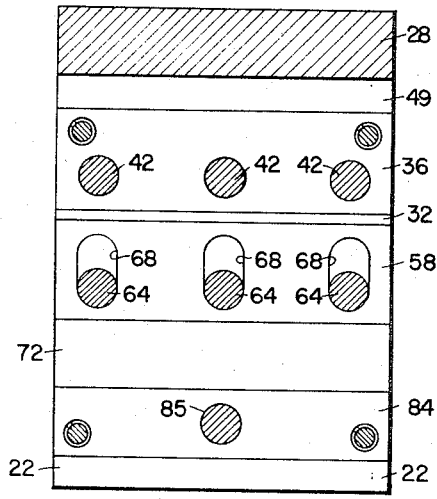
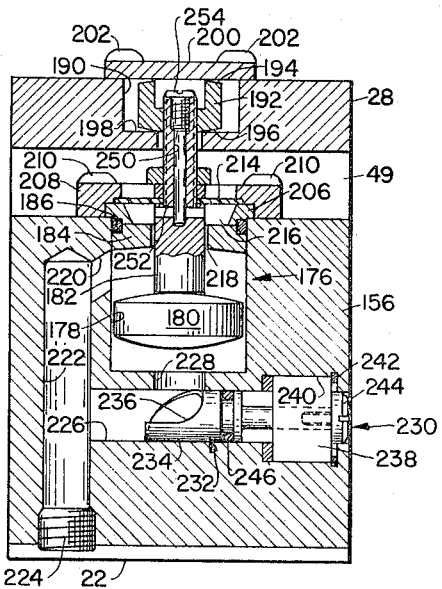
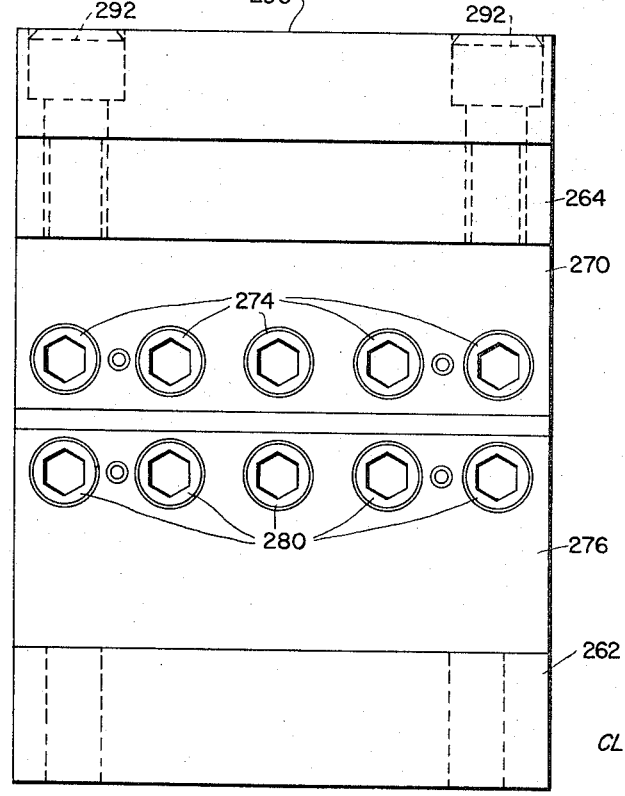
INVENTOR
CLARENCE JOHNSON
ATTORNEYS Nov. 28, 1967 C. JOHNSON 3,354,710
FORCE MEASURING INSTRUMENT
Filed Oct. 19, 1965 7 Sheets-Sheet 4
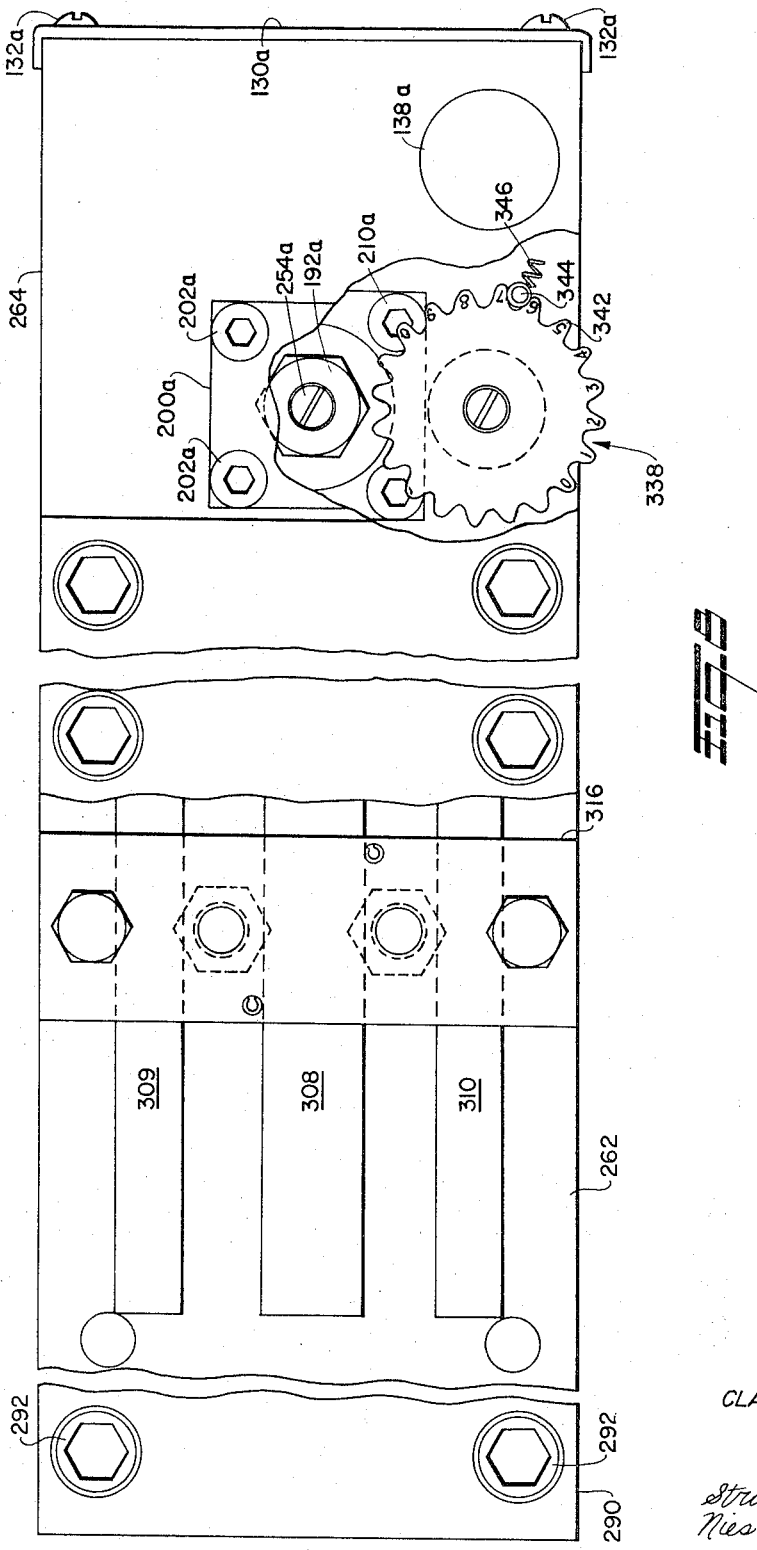
INVENTOR
CLARENCE JOHNSON
Strauch, Nolan, Neale,
Nies & Bronaugh
ATTORNEYS

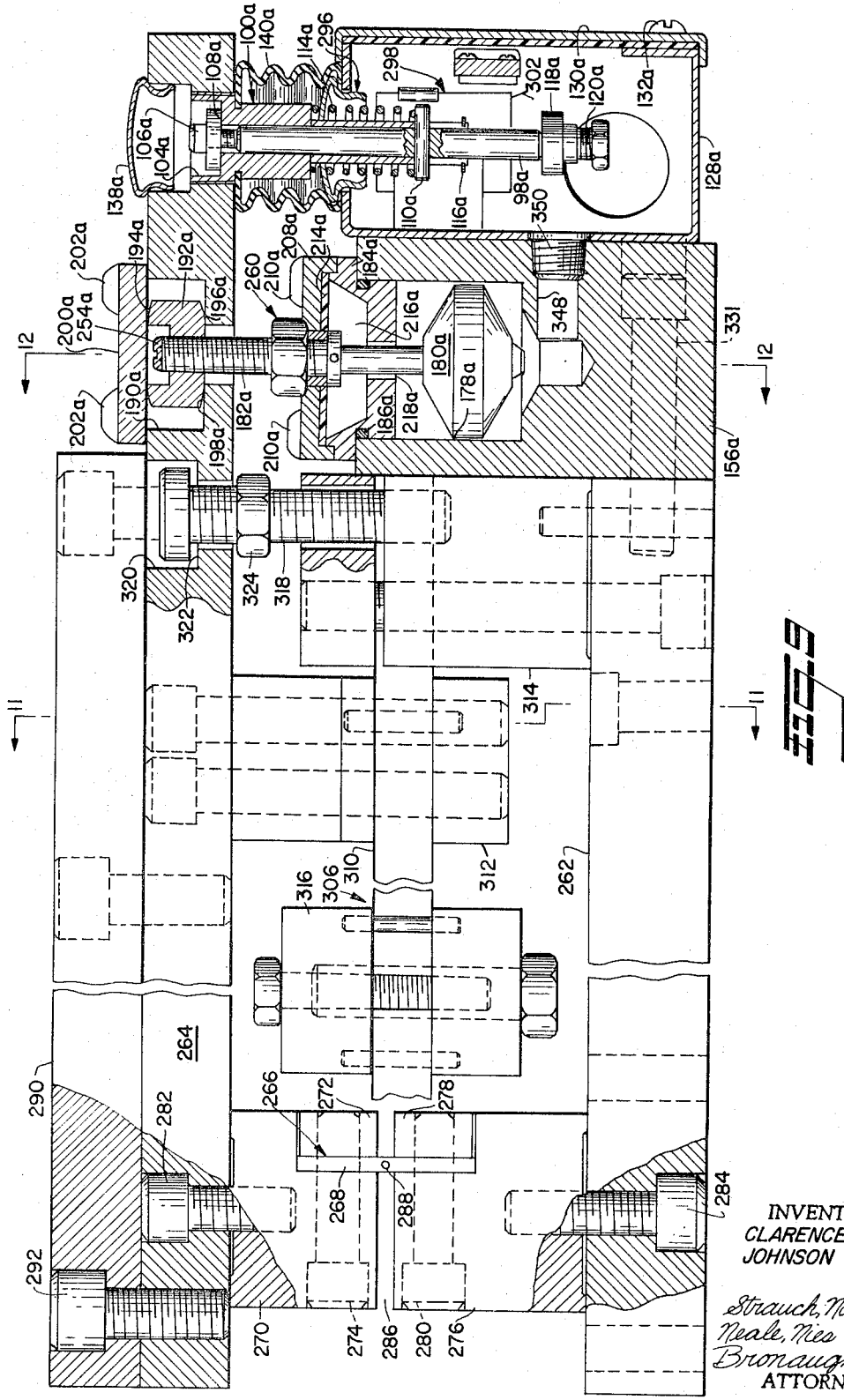

Nov. 28, 1967     C. JOHNSON     3,354,710
FORCE MEASURING INSTRUMENT
Filed Oct. 19, 1965     7 Sheets-Sheet 6
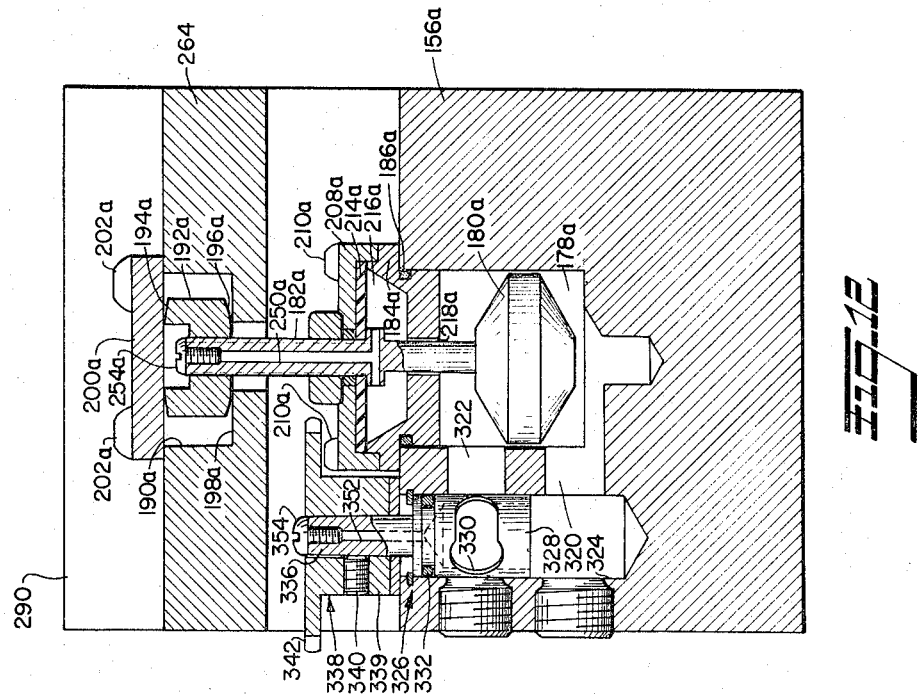
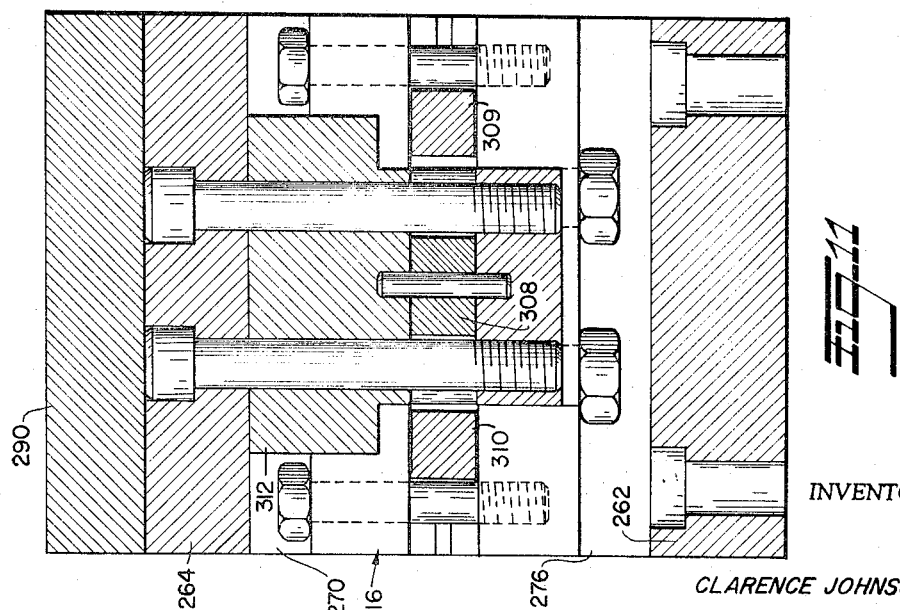
INVENTOR
CLARENCE JOHNSON
Strauch, Nolan, Neale,
Nies & Bronaugh
ATTORNEYS Nov. 28, 1967  C. JOHNSON  3,354,710

FORCE MEASURING INSTRUMENT

Filed Oct. 19, 1965  7 Sheets-Sheet 7

INVENTOR
CLARENCE JOHNSON

Strauch, Nolan, Neale,
Nies & Bronaugh
ATTORNEYS

United States Patent Office 3,354,710
Patented Nov. 28, 1967

3,354,710
FORCE MEASURING INSTRUMENT
Clarence Johnson, 31649 Trillium Trail, Pepper Pike, Cleveland, Ohio 44124
Filed Oct. 19, 1965, Ser. No. 498,156
21 Claims. (Cl. 73—141)

ABSTRACT OF THE DISCLOSURE

The force measuring instrument disclosed herein comprises a force or load receiving platform yieldably pivotally mounted on a support base by a flexure spring hinge. A clamp plate assembly fixing the spring hinge at spaced apart regions to the base and to the force receiving platform provides for the selective adjustment of the spring hinge flexure zone to vary the resistance of the spring to pivotal deflection of the platform.

---

This is a continuation-in-part of my copending application Ser. No. 472,978, filed July 19, 1965 for Force Measuring Instrument.

The present invention relates to force measuring instruments and especially to transducers which are capable of continuously measuring mechanically applied forces, weight, tension, and other measurable quantities or converting a mechanical force into another form of energy such as an electrical signal.

Typically, force transducers of the type with which the present invention is especially concerned essentially comprise a load supporting platform which is swingably mounted on a fixed base by a flexure pivot connection. Forces applied to pivotally deflect the load platform are resiliently opposed by a range adjustment leaf spring assembly operatively connected between the load platform and the base. The force imparted deflection of the load receiving platform which flexes the range adjusting leaf spring assembly is transmitted in a selected form of energy to an indicator, control element, or both. This type of force transducer is described in my United States Patent Nos. 2,981,100 and 3,182,495 respectively issued on Apr. 25, 1961 and May 11, 1965 for Force Measuring Instruments.

To simplify the construction of the foregoing type of force transducers, the present invention contemplates a novel force measuring instrument wherein the load receiving platform is operably connected to the support base through a flexure pivot plate whose resistance is adjustable to establish an operating range for the instrument. Accordingly, the adjustable resistance flexure plate connection in the instrument of this invention provides both a pivotal support for the load receiving platform and a load range adjustment to eliminate the need for a separate load range adjusting spring assembly as described in the aforesaid patents.

Accordingly, it is a major object of this invention to provide a novel, simplified force measuring instrument having a load receiving platform operably connected to a support base through an adjustable resistance flexure pivot connection.

A more specific object of this invention is to provide a novel force measuring instrument having a load receiving platform operably connected to a support base through an adjustable resistance flexure pivot plate which provides the only force transmitting, flexure spring connection between the platform and the base.

Another important object of this invention is to provide a novel dampening device for retarding pivotal deflection of a force receiving platform which is yieldably, pivotally connected to a support base in a force measuring instrument.

The dampening device of this invention is simple in construction, is easy to manufacture and assemble, and is readily adjustable in the field so that it may be correlated to force measuring control systems.

Further objects will appear as the description proceeds in connection with the appended claims and the annexed drawings wherein:

FIGURE 1 is a top plan view of a force measuring instrument constructed in accordance with the principles of this invention;

FIGURE 2 is a partially sectioned side elevation of the force measuring instrument shown in FIGURE 1;

FIGURE 3 is a bottom plan view of the force measuring instrument shown in FIGURE 1;

FIGURE 4 is a left-hand end elevation of the force measuring instrument illustrated in FIGURE 1;

FIGURE 5 is a section taken substantially along line 5—5 of FIGURE 2;

FIGURE 6 is a section taken substantially along line 6—6 of FIGURE 2;

FIGURE 7 is a further section taken substantially along line 7—7 of FIGURE 2;

FIGURE 8 is a top plan view of a further embodiment of a force measuring instrument constructed according to this invention wherein portions of the upper force-receiving platform are broken away to more clearly illustrate structural details;

FIGURE 9 is a partially sectioned side elevation of the force measuring instrument shown in FIGURE 8;

FIGURE 10 is a left-hand end elevation of the force measuring instrument shown in FIGURES 8 and 9;

FIGURE 11 is a section taken substantially along line 11—11 of FIGURE 9;

FIGURE 12 is a section taken substantially along line 12—12 of FIGURE 9; and

Figure 13:
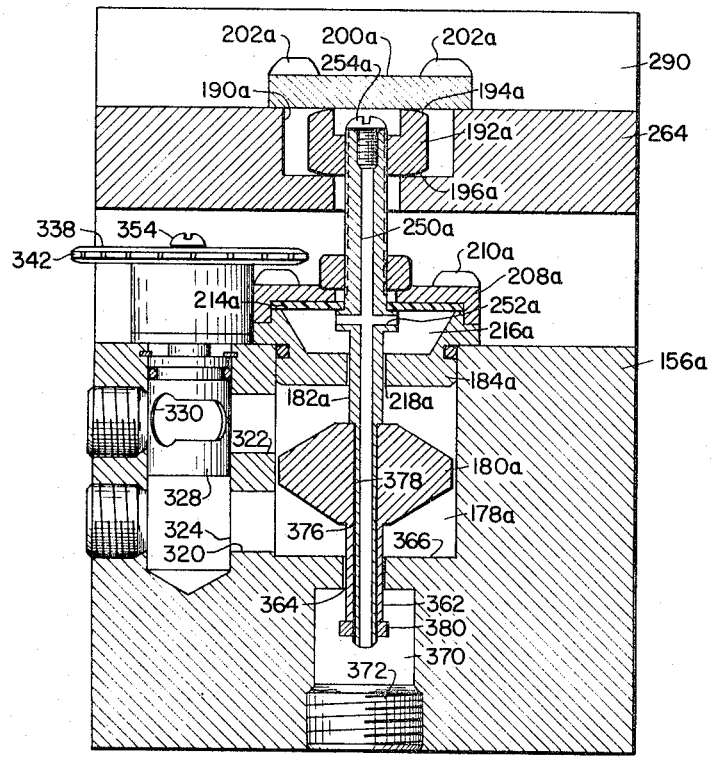
FIGURE 13 is a section similar to FIGURE 12, but showing a modified form of dampening device for the force measuring instrument of this invention.

Referring now to the drawings and more particularly to FIGURES 1-3, the reference numeral 20 designates a force measuring instrument constructed according to the principles of this invention and comprising a rigid rectangular base 22 which constitutes a support frame for the operating components of this invention. Base 22, which preferably is of adequate thickness to provide a rigid, fixed support, is formed with parallel, laterally spaced apart through bores 24 which are adapted to receive unshown mounting bolts for securing the instrument in a fixed, operative position. Base 22 may be mounted in any position since the functioning parts of the instrument are so constructed and arranged as to operate irrespective of the position in which base 22 is supported. Thus, base 22 may be mounted at any angle, either completely up-side-down or at any oblique angle by utilizing proper securing means.

As best shown in FIGURES 2 and 4, a force-receiving platform 28 comprising a relatively thick, flat-sided rectangularly shaped plate is supported on base 22 by a flexure pivot assembly 30 mounted adjacent to the corresponding left-hand ends of base 22 and platform 28. In the position of parts shown in the drawings, platform 28 is disposed vertically above base 22 and has a bottom surface facing the top surface of base 22.

Pivot assembly 30, as shown in FIGURES 2, 4, and 6, comprises a rectangular, flat-sided, flexure plate 32 disposed below the left-hand end of platform 28 and extending transversely of base 22 and platform 28. The upper end portion of flexure plate 32 extends between opposed, parallel surfaces formed on thin, rectangular, flat-sided bearing plates 36 and 37. A relatively thick, rectangular, flat-sided clamping plate 40 is butted against bearing plate 36 by a series of machine screws 42. Each of the screws 42 is inserted through a smooth bore 44 formed in clamping plate 40 and aligning apertures 46, 47, and 48 respectively formed in plates 36, 32, and 37. The ends of screws 42 are threaded into aligning blind tapped bores formed in a support block 49. When screws 42 are drawn tight, the upper portion of flexure plate 32 is tightly clamped between bearing plates 36 and 37, and the sub-assembly of plates 32, 36, and 37 is tightly clamped between opposed surfaces on clamping plate 40 and support block 49.

As best shown in FIGURE 2, support block 49 depends from the left-hand end portion of platform 28 and is rigidly fixed thereto by a pair of machine screws 50 which are upwardly inserted through parallel, smooth, stepped bores 52 formed through support block 49. The ends of screws 50 protruding beyond bores 52 are threaded into aligning tapped bores 54 formed in platform 28.

With continuing reference to FIGURES 2, 4, and 6, an intermediate portion of flexure plate 32 extends between opposed, parallel surfaces formed on thin rectangularly shaped, flat-sided, micrometer bearing plates 58 and 60. A relatively thick, rectangular, flat-sided clamping plate 62 is seated against bearing plate 58 by a series of machine screws 64. Each of the screws 64 is inserted through a smooth bore 66 formed in clamping plate 62 and aligning apertures 68, 69, and 70 respectively formed in plates 58, 32, and 60. The end of each screw 64 protruding beyond aperture 70 is threaded into an aligning, tapped, blind bore formed in a support block 72. When screws 64 are drawn tight, the intermediate portion of flexure plate 32 below clamping plate 40 is clamped tightly between bearing plates 58 and 60, and the sub-assembly of plates 32, 58, and 60 is tightly clamped between opposed, parallel, flat surfaces on clamping plate 62 and support block 72.

With continuing reference to FIGURES 2, 4 and 6, support block 72 is rigidly fixed to the left-hand end of base 22 by a pair of machine screws 74 which are inserted downwardly through parallel, smooth walled, stepped bores 76 in support block 72 and threaded into aligning, tapped blind bores 78 formed in base 22.

As best shown in FIGURE 2, support block 72 is spaced vertically below support block 49 to provide a horizontally extending clearance space that permits the free end of platform 28 to be deflected about the pivot axis of the pivot assembly 30 which is located essentially at 82. Axis 82 normally intersects the longitudinal flexure axis of flexure plate 32 and extends laterally of platform 28 adjacent to the clearance space between support blocks 49 and 72. In the position of parts shown in FIGURE 2, flexure plate 32 is unflexed, and platform 28 and base 22 are disposed in substantially parallel relationship with the opposed, planar surfaces on support blocks 49 and 72 respectively being contained in spaced apart, substantially parallel planes. By applying a load to platform 28, flexure plate 32 is flexed in the region of pivot axis 82 to allow platform 28 to pivot in a clockwise direction about axis 82.

The dimensions and material requirements of flexure plate 32 are selected in accordance with the range of forces to be measured to provide, as an example, an annular deflection range of about ten minutes and to assure that the maximum and minimum deflecting forces to be encountered in use will fall within the elastic limits of the material. Owing to the substantial lateral dimensions of flexure plate 32 and of plates 36, 37, 40, 58, 60, and 62 providing a firm clamping connection to support blocks 49 and 72, platform 28 is constrained against lateral movement.

As shown in FIGURE 2, the downwardly facing edges of plates 36 and 37 are contained in a plane extending horizontally above axis 82. The upwardly facing edges of plates 58 and 60 are essentially parallel with the opposed edges on plates 36 and 37 and extend below axis 82 to delimit an unrestrained longitudinally extending flexure region containing axis 82.

In accordance with this invention, apertures 68 and 70 are, as best shown in FIGURE 6, vertically elongated to enable bearing plates 58 and 60 to be displaced toward and away from plates 36 and 37 by loosening screws 64. By selectively shifting plates 58 and 60 along paths extending parallel to the longitudinal axis of flexure plate 32 and at right angles to pivot axis 82, it will be appreciated that the length of the flexure region of flexure plate 32 may infinitely be varied between limits to thereby correspondingly vary the resistance of flexure plate 32 to pivotal displacement of platform 28 about axis 82. Decreasing the length of the flexure region of plate 32 stiffens plate 32 to increase its resistance to pivotal displacement of platform 28. Increasing the length of the flexure region of plate 32, on the other hand, lessens the resistance of plate 32 to pivotal displacement of platform 28. This selective variation of the length of the flexure region of plate 32 thus provides the instrument of this invention with a load range adjustment whereby the resistance of flexure plate 32 to force-imparted deflection of platform 28 may be set to conform to expected conditions in a given installation.

With continued reference to FIGURES 2, 4, and 6, the lower end of flexure plate 32 extends between the rearwardly facing, planar end face of base 22 and a further bearing plate 84. A machine screw 85 extending through aligned bores in clamping plate 62, bearing plate 84, and flexure plate 32 is threaded into a blind tapped bore formed in base 22 to clamp the lower end of flexure plate 32 between bearing plate 84 and the rearwardly facing, planar end face of base 22. Thus, when screws 64 are loosened to shift micrometer bearing plates 58 and 60 for varying the length of the longitudinal flexure zone of flexure plate 32, screws 85 and 42 securely retain flexure plate 32 in position relative to base 22 and platform 28.

As an example of utilizing the force measuring instrument of this invention, platform 28 may be mounted to support a run of a conveyor belt, the tension of which is to be measured. It will be appreciated, however, that any other means of transmitting a force to platform 28 may be employed depending upon the use desired to be made of the force measuring instrument. For example, strain gauges, air gauges, and other devices may be connected to platform 28 for data transmission purposes.

As shown in FIGURES 1, 2, and 5, platform 28 extends forwardly from the pivot connection provided by assembly 30 to a region disposed beyond the forward end of base 22. In this embodiment, the forward, pivotally deflectable end of platform 28 is connected by a motion transmitting assembly 90 to a suitable controller comprising an armature core 92 of a differential transformer 94 which is operative to convert the pivotal displacement of platform 28 into an electrical signal that may be transmitted to a suitable controller, indicator, or recorder.

As best shown in FIGURE 5, a null adjustment device 96, forming a part of motion transmitting assembly 90 for calibrating the instrument, comprises a cylindrical rod 98 which coaxially and slidably extends through a rigid sleeve 100. Sleeve 100 depends from platform 28 and is formed with an upper diametrically enlarged end section 102 threadedly received in a tapped section of a vertical through bore 104 formed in the forward portion of platform 28 overhanging base 22. A fine threaded, adjustment cap screw 106 is coaxially threaded into the upper end of rod 98 and has a head that is adapted to seat on an annular, upwardly facing shoulder 108 on sleeve 102 to limit downward displacement of rod 98.

With continuing reference to FIGURE 5, a cylindrical pin 110 coaxially extends with a snug fit through a bore formed in rod 98 at right angles to the longitudinal axis thereof. The opposite ends of pin 110 protrude beyond the periphery of rod 98 and extend with a sliding fit through diametrically opposed, longitudinal, downwardly opening slots 112 formed in the lower end of sleeve 100. A helically coiled spring 114 surrounding a reduced diametered section of sleeve 100 is compressed between pin 110 and an external, downwardly facing annular shoulder formed on sleeve 100 to bias rod 98 downwardly and thereby seat the head of screw 106 on shoulder 108. A groove-seated snap ring 116 carried on the lower end of sleeve 100 is abuttable with the protruding ends of pin 110 to limit relative displacement between rod 98 and sleeve 100.

Still referring to FIGURE 5, the lower end of rod 98 extends beyond sleeve 100 and carries a crossbar 118 which extends laterally with respect to platform 28 and which threadedly mounts a vertical, internally and externally threaded sleeve 120. An adjustable rod 122 coaxially threaded into sleeve 120 interconnects core 92 and sleeve 120 along a common axis extending parallel to the longitudinal axes of rod 98 and sleeve 100.

Core 92 is coaxially received in a hollow transformer winding 124 which is fixed by a suitable bracket 126 to the back wall of a conduit box 128 having a forwardly facing opening. A gasketed cover plate 130 extends over the opening of conduit box 128 and is detachably secured to box 128 by screws 132. Conduit box 128 is fixed to the forward end of base 22 by any suitable means. The side walls of conduit box 128, as shown in FIGURE 5, are provided with apertures 134 for receiving suitable electrical conductor fittings (not shown) through which unshown electrical leads extend for connection to the terminals of winding 124.

From the abov description of the motion transmitting assembly 90, it will be appreciated that deflection of platform 28 above the pivot connection axis 82 imparts a proportional axial displacement to core 92 for varying the magnitude of the electrical output signal at the terminals of winding 124. Zero or null adjustment is effected by threading screw 106 into and out of rod 98 to axially displace rod 98 and, consequently, core 92 to a zero set position relative to platform 28. Rod 98 is prevented from turning with screw 106 by engagement of pin 110 with the side edges of slots 112. Spring 114 in biasing rod 98 downwardly is effective to take up any lost motion in the motion transmitting assembly 90, thereby assuring a proportional displacement of core 92 when platform 28 is pivotally deflected about the pivot axis 82.

Preferably, assembly 90 is effective to compensate for ambient temperature variations in the manner described in detail in the aforesaid copending application Ser. No. 472,978.

As shown in FIGURE 5, a snap-on cap 138 is seated in the upper end of bore 104 and cooperates with a corrugated, flexible bellows 140 of negligible resistance and with cover 130 to provide a substantially air-tight space for the assembly 90 and transformer 94 as described in greater detail in the aforesaid copending application Ser. No. 472,978.

As best shown in FIGURE 2, an assembly 150 for limiting pivotal deflection of platform 28 in opposite directions and for jacking platform 28 to support the load thereon when the flexure region of flexure plate 32 is being adjusted comprises a machine screw 152 threaded into a vertical, upwardly opening, blind, tapped bore 154 formed in a support block 156. Block 156 is rigidly fixed to the forward end of base 22 by machine screws 158. The head of screw 152 is disposed vertically below platform 28 to limit the downward displacement of platform 28 about pivot axis 82. Screw 152 is formed with a coaxial, tapped through bore 160 which threadedly receives the lower end of a smaller diametered machine screw 162. Machine screw 162 extends freely upwardly through a smoothly walled, stepped through bore 164 formed in platform 28 and defining an upwardly facing annular shoulder 166. The head of screw 162 is disposed vertically above shoulder 166 to limit upward pivotal deflection of platform 28 about axis 82. The axial distances between opposed surfaces on the heads of screws 152 and 162 thus determines the maximum deflection of platform 28 about axis 82 and may selectively be varied by threading screw 162 into and out of bore 160. A set screw 168 threaded into a radial bore formed in screw 152 locks screw 162 in its adjusted position.

To adjust the load range of the force measuring instrument just described, screw 152 preferably is first threaded upwardly to butt against the underside of platform 28 and thereby take up the load normally applied to flexure plate 32. With the load on flexure plate 32 relieved, screws 64 are then loosened and micrometer bearing plates 58 and 60 are shifted upwardly or downwardly to vary the length of the flexure region of flexure plate 32 for selectively adjusting the resistance of flexure plate 32 to pivotal deflection of platform 28. After bearing plates 58 and 60 have been shifted to their new positions, screws 64 are re-tightened and screw 152 is threaded downwardly to its platform stop limiting position shown in FIGURE 2. From the foregoing, it is apparent that the length of the flexure region of flexure plate 32 may indefinitely be varied by selectively shifting micrometer bearing plates 58 and 60 upwardly or downwardly to thus provide for a quick and easy adjustment of the load range of the instrument.

Referring now to FIGURES 2 and 7, the force measuring instrument of this invention may optionally be provided with a dampening device 176 for retarding pivotal movement of platform 28. Dampening device 176 comprises an upwardly opening, smooth-walled cylinder bore 178 formed in support block 156 along an axis that is contained in a plane substantially normally intersecting the pivot axis 82. Slidably, coaxially received in cylinder bore 178 is a piston 180 which is fixed to a piston rod 182. Piston rod 182 coaxially extends upwardly and freely through an aperture formed in a closure plate 184 which extends over the upper open end of cylinder bore 178. A groove seated resilient O-ring 186 carried by end plate 184 provides a fluid-tight seal around the periphery of cylinder bore 178 adjacent the upper open end thereof.

With continuing reference to FIGURE 7, the upper end of piston rod 182 extends freely into a stepped, smooth walled, vertical bore 190 formed in platform 28 and is externally threaded to mount a motion transmitting coupling part 192. Part 192 is coaxial with piston rod 182 and is formed with oppositely facing, segmental spherical end faces 194 and 196. End face 196 is seated on an upwardly facing annular shoulder 198 formed between stepped regions of bore 190. The upwardly facing segmental spherical surface 194 separably abuts the underside of a flat-sided clamping plate 200 which extends over bore 190 and which is detachably fixed to platform 28 by machine screws 202. Part 192 is thus axially clamped between plate 200 and shoulder 198 in bore 190. As shown, the underside of clamping plate 200 and annular shoulder 198 are contained in substantially parallel spaced apart planes normally intersecting the axis of bore 190. The spherical surfaces 194 and 196 respectively engaging shoulder 198 and the underside of clamping plate 200 cooperate to provide a motion-transmitting universal knuckle joint between piston rod 182 and platform 28.

When platform 28 is pivotally displaced about axis 82, the opposed clamping surfaces on plate 200 and shoulder 198 slide over the oppositely facing segmental spherical surfaces 194 and 196 respectively to allow part 192 to effectively pivot relative to platform 28. As a result, piston rod 182 is maintained in alignment with the axis of bore 178 to assure smooth motion of piston 180 without binding.

With continuing reference to FIGURE 7, end plate 184 is shown to be formed with an upwardly and radially outwardly extending shoulder 206 which overlaps the upwardly facing marginal edge surface of block 156 peripherally surrounding the open end of bore 178. Shoulder 206 is axially clamped between the upwardly facing surface of block 156 and an annular clamping plate 208 by machine screws 210. A flexible diaphragm seal 214 circumferentially surrounding piston rod 182 is clamped about its peripheral marginal edge between opposed annular surfaces on clamping plate 208 and shoulder 206. As shown, end plate 184 is inwardly recessed to define with diaphragm 214 a reservoir chamber 216 which is in constant fluid communication with chamber 178 at the rod end of piston 180 through an annular clearance space 218 formed between the periphery of piston rod 182 and the aperture in plate 184 through which piston rod 182 freely extends. Liquid stored in chamber 216 is adapted to flow through clearance space 218 into the upper end of cylinder bore 178 when piston 180 is moved axially downwardly toward the bottom of bore 178.

With continuing reference to FIGURE 7, a lateral passage 220 formed in support block 156 opens into the upper end of bore 178 above piston 180 and below end wall 184. Passage 220 is intersected by a vertical bored passage 222 formed in support block 156 along an axis laterally offset from and parallel to the longitudinal axis of cylinder bore 178. Passage 222 is formed inwardly from the downwardly facing planar underside of support block 156 and is threaded at its lower end to receive a plug 224. To charge dampening device 176 with liquid, plug 224 is removed and dampening liquid is pumped into cylinder chamber 178 through passages 222, 220, 226 and 228 and also into reservoir chamber 216.

With continuing reference to FIGURE 7, passage 222 is intersected by a smooth walled, bored passage 226 formed in support block 156 and communicating through a port 228 with the lower end of cylinder bore 178 on the side of piston 180 opposite from the passage 220. Port 228 is coaxially formed in the bottom wall of cylinder bore 178 and normally intersects passage 226.

To control flow of liquid from one side of piston 180 to the other, a bypass valve closure member 230 is provided with a sleeve-shaped skirt portion 232 which is rotatably and coaxially received in passage 226. Skirt portion 232 is formed with a circumferentially extending section 234 and has a rearwardly cut lip 236 in the form of a helix. When valve closure member 230 is rotated to a closed position section 234 overlaps port 228 to block fluid flow between cylinder bore 178 and passage 226. By turning valve closure member 230 from this flow blocking position, the unblocked flow area of port 228 is gradually increased by the rearwardly cut helix lip 236 to thus provide a fine control of fluid flowing through port 228.

Still referring to FIGURE 7, valve closure member 230 is formed with an enlarged, cylindrical end section 238 which is rotatably and coaxially received in an enlarged stepped bore section 240 formed at the outer end of passage 226. Valve closure member 230 is axially retained in place between an internal annular shoulder formed at the bottom of bore section 240 and a groove-seated snap ring 242.

A machine screw 244 coaxially threaded into section 238 may be engaged by a screwdriver or similar tool for rotating valve closure member 230 to a selected position for controlling the flow of fluid bypassing piston 180 through passages 220, 222, and 226 and port 228. A groove-seated resilient O-ring 246 carried by skirt portion 32 provides a fluid-tight seal with the inner periphery of passage 226.

In operation of the dampening device just described, a suitable incompressible liquid of high viscosity is introduced through passage 222 for charging the device, and valve closure member 230 is turned to a selected position for metering the liquid bypassing piston 180 when the latter is displaced in opposite directions by pivotal deflection of platform 28. When platform 28 is deflected downwardly, piston 180 is displaced axially downwardly in cylinder bore 178 to force liquid out of the bottom end of bore 178 through port 228 at a rate which is metered by valve closure member 230. This liquid flows through passages 226, 222 and 220 and into the upper end of cylinder chamber 178 above piston 180. When platform 28 is pivoted upwardly to axially displace piston 180 upwardly, liquid in the upper end of bore 178 flows through passages 220, 222, and 226 and into the lower end of bore 178 at a rate metered by valve closure member 230. To slow down the response of the force measuring instrument of this invention valve closure member 230 is turned in a direction to reduce the flow area through port 228. To increase the response of the force measuring instrument, valve closure member 230 is turned in a direction to increase the flow area through port 228. Thus, the rate of pivotal displacement of platform 28 may be controlled by easy adjustment of valve member 230.

Dampening device 176 is particularly advantageous when the force measuring instrument of this invention is connected to machinery or systems that produce violent vibrations during operation. One example of this is in paper mill machines where the force measuring instrument of this invention is used to measure the tension applied to paper sheets running through the machine at speeds about 6000 feet per minute and in which the rolls revolve at a rate of about 3000 r.p.m. These rolls are sometimes ten feet long and may become unstable at critical speeds to the extent that they wobble near their centers. Sometimes these rolls are not perfectly balanced or they may pick up wads of material which results in slight unbalances. These unbalances although not serious at slow speeds become especially critical at very high speeds at which the paper machine usually is operated. Under such conditions, operation at high speeds causes excessive vibrations to occur intermittently. By incorporating dampening device 176 into the force measuring instrument of this invention under these conditions, the retardation of movement of platform 28 prevents the objectionable transmission of the short and sometimes violent and erroneous pulses to the output of the force measuring instrument at transformer 94.

As shown in FIGURE 7, piston rod 182 is formed with a longitudinal bore 250 extending downwardly from the upper rod end and being intersected by radial passages 252 at its lower end. Passages 252 open into the upper end of reservoir chamber 216. The upper end of passage 250 is threaded to receive a screw 254. By removing clamping plate 200 and by loosening screw 254, air trapped in reservoir chamber 216 when charging dampening device 176 with liquid may be removed to assure that no air remains in the system. The supply of liquid in chamber 216 assures that cylinder bore 178 and passages 220, 222, and 226 remain filled with liquid during operation of the force measuring instrument.

FIGURES 8–12 illustrate another embodiment of a force measuring instrument which is essentially the same as that described in the aforesaid copending application Ser. No. 472,978 except that a dampening device 260 has been added. The force measuring instrument incorporating device 260 is best shown in FIGURES 8 and 9 to essentially comprise a rigid, rectangular base 262 which constitutes the support frame for the operating components of the instrument. A force-receiving platform 264 is supported on base 262 by a flexure pivot assembly 266 comprising a flat-sided, upstanding flexure plate 268. The upper end of flexure plate 268 is securely clamped to a support block 270 by a clamping plate 272 and machine screws 274. The lower end of flexure plate 268 is securely clamped to a support block 276 by a clamping plate 278 and machine screws 280. Support block 270 depends from the underside of platform 264 and is fixed thereto by machine screws 282 (one shown in FIGURE 9). Support block 276 is disposed vertically below support block 270 and is fixed to base 262 by machine screws 284 (one shown in FIGURE 9). Support blocks 270 and 276 are formed with opposed planar surfaces which delimit a horizontally extending clearance space 286.

The upper end of flexure plates 268 is clamped firmly between parallel opposed planar surfaces on support block 270 and clamping plate 272 by tightening screws 274. The lower end of flexure plate 268 is firmly clamped between opposed, planar, parallel surfaces on support block 276 and clamping plate 278 by tightening screws 280. With this construction, flexure plate 268 provides a hinge or flexure pivot connection between platform 264 and base 262, the axis of the hinge being located approximately at 288 extending laterally of platform 264 in clearance space 286.

In the position of parts shown in FIGURE 9, flexure plate 268 is unflexed and platform 264 and base 262 are disposed in substantially parallel reltaionship, with the opposed planar surfaces of support blocks 270 and 276 delimiting clearance space 286 being contained in essentially parallel planes. By applying a load to platform 264, plate 268 is flexed to allow platform 264 to pivot in a clockwise direction about axis 288. A flat-sided adaptor plate 290 advantageously is fixed to platform 264 by machine screws 292 to receive the force or load to be measured.

As shown in FIGURES 8 and 9, platform 264 extends forwardly from the pivot connection provided by assembly 266 to a region disposed beyond the forward end of base 262. This forward deflectable end of platform 264 is connected by a motion transmitting assembly 296 to an unshown armature core of a differential transformer 298. Motion transmitting assembly 296 and conduit box enclosure is the same as that described in the embodiment of FIGURES 1-7. Accordingly, like reference numerals have been used to identify like parts except that the parts of motion transmitting assembly 296 have been suffixed with the letter "a."

The pivotal deflection of platform 264 is transmitted by assembly 296 to axially displace the armature core of transformer 298 for varying the magnitude of an electric output signal at the terminals of a winding 302 in the same manner as described in the previous embodiment.

With continuing reference to FIGURES 8-10, a range adjustment cantilever spring assembly 306 reacts against base 262 to resiliently resist pivotal displacement of platform 264 by forces applied thereto. Spring assembly 306 comprises a center leaf spring 308 extending along the longitudinal axis of the instrument between and in parallel spaced apart relation to a pair of side leaf springs 309 and 310. Spring 308, as best shown in FIGURE 11, is fixedly secured in cantilever fashion at its right-hand end to platform 264 by a clamping block and bolt assembly 312. Springs 309 and 310 are fixedly secured in cantilever fashion at their corresponding, right-hand ends to base 262 by a further clamp and support block assembly 314. The corresponding, left-hand free ends of springs 308-310 are rigidly clamped together at a region spaced from their cantilever clamping positions to platform 264 and 262 by an adjustable clamping plate assembly 316. With this construction, flexing forces applied to platform 264 are transmitted first through spring 308 and in parallel relation through springs 309 and 310. The longitudinal flexure axes of springs 308-310 are contained in essentially parallel spaced apart planes normally intersecting pivot axis 288. In their unflexed position shown in the drawings, the longitudinal flexure axes of springs 308-310 are contained in a common plane extending about midway between the opposed bottom and top faces of platform 264 and base 262 and essentially containing the pivot connection axis 288.

For limiting pivotal displacement of platform 264 in opposite directions, a machine screw 318 is threaded into a blind tapped bore formed in the clamping block of assembly 314 and extends upwardly freely through a smooth-walled, stepped, through bore 320 formed in platform 264. An internal upwardly facing annular shoulder 322 formed in bore 320 is adapted to butt against the underside of the head of screw 318 to limit upward displacement of platform 264 from the position shown in the drawings. The underside of platform 264 is adapted to butt against a nut 324 threaded onto screw 318 for limiting downward displacement of platform 264.

Since the foregoing construction of the embodiment shown in FIGURES 8-12 is esentially the same as that described in the aforesaid copending application Ser. No. 472,978, reference thereto is made in the event further details are needed for a complete understanding of this invention.

As shown in FIGURES 9 and 12, damping device 260 is esentially the same as the dampening device contained in the embodiment of FIGURES 1-7. To the extent that dampening devices 260 and 176 are alike, like reference numerals have been used to identify like parts except that the components of dampening device 260 have been suffixed by the letter "a."

As best shown in FIGURE 12, parallel fluid passages 320 and 322 open into cylinder bore 178a at axially spaced apart regions disposed on opposite sides of piston 180a. Passages 320 and 322 extend laterally from cylinder chamber 178a and intersect a bored vertical passage 324 formed in block 156a. A valve closure member 326 for controlling flow of fluid between passages 320 and 322 is shown to comprise a cylindrical skirt section 328 coaxially and rotatably received in passage 324 radially adjacent passage 322. Skirt section 328 is formed with a circumferential key-shaped fluid control port 330 which is adapted to be aligned and disaligned radially with passage 322 for metering flow of fluid between passages 322 and 320 in the manner described in the previous embodiment. Support block 156a is suitably fixed to the forward end of base 262 by screws indicated at 331.

A resilient, groove-seated O-ring 332 carried by skirt section 328 adjacent the upper end thereof is compressed peripherally against the internal smooth-walled surface of passage 324 for establishing a fluid-tight seal to prevent escape of liquid from dampening device 260.

As is best shown in FIGURES 8 and 12, valve closure member 326 is provided with a stem 336 formed rigid with skirt section 328 and protruding coaxially, upwardly beyond passage 324. An indicating control wheel 338 is formed with a hub 339 which is coaxially fixed by a set screw 340 to the upper protruding end of stem 336. Wheel 338 is formed at its periphery with radially extending gear teeth 342 which engage with a positive detent member 344. Member 344 is mounted on block 156a and is biased by a spring 346 into engagement with teeth 342 on wheel 338. Teeth 342 may be provided with suitable indicia as shown in FIGURE 8 for indicating the position of port 330 relative to passage 322. Teeth 342 and member 344 thus provide a positive, detent for releasably locking valve closure member in a selected position. As shown, wheel 338 is disposed between platform 264 and block 156a so that it is easily accessible for manual adjustment.

By turning valve closure member 326 between its angularly spaced apart flow control positions provided by gear teeth 342 and member 344, it will be appreciated that the flow area of port 330 aligning with passage 322 may be varied to correspondingly vary the flow rate of liquid bypassing piston 180a. Thus, by increasing or decreasing the flow area or port 330 aligning with passage 322, the resistance to pivotal deflection of platform 264 may be selectively varied. By forming port 330 with a key shape as shown in FIGURE 12, fine and coarse adjustments of fluid flow between passages 320 and 322 are provided for.

To charge cylinder bore 178a with dampening liquid, a bored passage 348 (see FIGURE 9) extends inwardly from the front side of block 156a and communicates with passage 324 through passage 320. The outer end of passage 348 is threaded to receive a suitable sealing plug 350 which may be removed when it is desired to fill the dampening device with liquid. To assure removal of air from the communicating passages in dampening device 260, valve stem 336 is formed with a longitudinally extending, through bore 352 communicating at its inner end with the interior of skirt section 328. The upper end of bore 352 is threaded to receive a screw 354. When dampening device 260 is being charged with liquid through passage 348, screws 354 and 254a are removed to bleed air from the communicating passages and cylinder bore 178a.

In the modified piston and piston rod assembly shown in FIGURE 13, the piston is shown to be formed with a reduced diametered longitudinal extension 362 which coaxially extends with a small clearance 364 through an end wall 366 opposing end wall 184a and delimiting cylinder bore 178a. The diameter of extension 362 is the same as the diameter of piston rod 182a extending away from the opposite side of piston 180a to provide piston 180a with oppositely facing surfaces of substantially equal area. Thus, piston 180a of FIGURE 13 is effectively balanced such that the oppositely acting fluid forces acting on oppositely facing surfaces of piston 180a are equal when the fluid pressures on opposite sides of piston 180a are equal.

With continuing reference to FIGURE 13, the lower end of extension 362 protrudes into a liquid reservoir 370 which is formed by a bored passage extending upwardly from the underside of block 156a along an axis aligning with cylinder bore 178a. This bored passage is threaded at its lower end to receive a sealing plug 372. Clearance space 364 establishes continuous fluid communication between reservoir 370 and the lower end of cylinder bore 178a below piston 180a. Thus, in the embodiment of FIGURE 13, reservoirs 370 and 216a are respectively in fluid communication with opposite ends of cylinder chamber 178a to assure that cylinder 178a remains filled with liquid when piston 180a is displaced in opposite directions.

To bleed air from reservoir 370 when dampening device 260 is being charged with liquid, piston rod 182a is provided with a longitudinal extension 376 which coaxially extends through a central bore 378 in piston 180a and extension 362. The lower end of extension 376 protrudes beyond extension 362 and is threaded to receive a nut 380. Piston 180a is axially confined between nut 380 and an opposed annular shoulder on piston rod 182a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A force measuring instrument comprising a support base, a platform for receiving forces to be measured, a flexure spring hinge yieldably pivotally mounting said platform on said base, said spring hinge being flexed by forces applied to said platform to provide for the pivotal deflection of said platform about a transverse axis, means connected to said platform to transmit the force-imparted pivotal motion of said platform to a utilization device; and means for selectively adjusting the resistance of said flexure spring hinge to pivotal deflection of said platform.

2. The force measuring instrument defined in claim 1 wherein said flexure spring hinge provides the only force transmitting flexure spring connection between said platform and said base for resisting pivotal deflection of said platform.

3. A force measuring instrument comprising a support base, a platform for receiving forces to be measured, a flexure spring fixed at longitudinally spaced apart regions to said platform and said base for yieldably pivotally mounting said platform on said base, said flexure spring providing the only force transmitting, flexure spring connection between said base and said platform for resisting pivotal deflection of said platform by forces applied thereto, means providing said flexure spring with a flexure zone extending longitudinally between said regions, and means for selectively adjusting the longitudinal length of said flexure zone to vary the resistance of said spring to pivotal deflection of said platform.

4. A force measuring instrument comprising a support base, a platform for receiving forces to be measured, a flexure spring fixed at longitudinally spaced apart regions respectively to said platform and said base for yieldably pivotally mounting said platform on said base, means providing said flexure spring with a flexure zone extending longitudinally between said regions, said spring being flexed by forces applied to said platform to provide for the pivotal deflection of said platform about a transverse axis, means connected to said platform for transmitting the pivotal motion of said platform to a utilization device, and means for selectively adjusting the longitudinal length of said flexure zone to vary the resistance of said spring to pivotal deflection of said platform for establishing an instrument operating range.

5. The force measuring instrument defined in claim 4 wherein said transverse axis normally intersects the flexure axis of said spring and extends between said platform and said base.

6. A force measuring instrument comprising a support base, a force receiving platform, a flexure spring fixed at longitudinally spaced apart regions respectively to said platform and said base for yieldably, pivotally mounting said platform on said base, means providing said flexure spring with a flexure zone extending longitudinally between said regions, means for selectively adjusting the longitudinal length of said flexure zone to vary the resistance of said spring to pivotal deflection of said platform for establishing an instrument operating range, and a dampening device having a cylinder fixed to said base, a piston slidably received in said cylinder, means for controllably supplying fluid to said cylinder on opposite sides of said piston, and means operably connecting said piston to said platform remote from the connection to said flexure spring and comprising a piston rod rigid with said piston, a part on said rod, clamping means engaging said part to transmit pivotal deflection of said platform to axially displace said piston, and coacting surface means on said part and said clamping means providing a universal connection between said rod and said platform to maintain said piston rod in alignment with the axis of said cylinder.

7. The force measuring instrument defined in claim 6 wherein said coacting surface means comprises interengaging segmental spherical and relatively flat surfaces.

8. The force measuring instrument defined in claim 6 wherein said coacting surface means comprises oppositely facing segmental spherical surfaces formed on said part and engaging opposed relatively flat surfaces on said clamping means.

9. The force measuring instrument defined in claim 6 comprising an end wall for said cylinder, and a fluid reservoir chamber delimited by said end wall, said piston rod extending freely through said end wall with a clearance space that provides for fluid communication between said chamber and said cylinder.

10. The force transmitting instrument defined in claim 9 wherein said piston rod extends through said chamber and has passage means formed therein for bleeding air from said chamber.

11. The force measuring instrument defined in claim 6 wherein said means supplying fluid to said cylinder comprises fluid passage means establishing fluid communication between ends of said cylinder on opposite sides of said piston, and valve means in said passage means for selectively controlling the flow of fluid therethrough.

12. A force measuring instrument comprising a support base, a force receiving platform spaced from said base, a flexure plate disposed between said base and said platform, clamping means fixing said flexure plate along longitudinally spaced apart regions respectively to said base and said platform respectively for yieldably mounting said platform for bodily swinging movement about an axis normally intersected by the flexure axis of said plate, means defining rigid bearing surfaces butted against said flexure plate by said clamping means to prevent said plate from flexing except along a zone disposed longitudinally between said regions and means for selectively shifting at least one of said bearing surfaces to vary the longitudinal length of said zone whereby the resistance of said flexure plate to pivotal deflection of said platform is varied to establish an instrument operating range.

13. A force measuring instrument comprising a base, a force receiving platform having one end extending over a portion of said base in spaced relation thereto, a flexure plate extending between said base and said platform, releasable clamping means securing said plate along longitudinally spaced apart regions respectively to said base and said end of said platform for yieldably mounting said platform on said base for pivotal movement toward and away from said base along an axis normally intersecting the flexure axis of said plate, means including a pair of bearing plates clamped by said clamping means against said regions of said flexure plate to prevent flexing movement of said flexure plate in said regions, said bearing plates being longitudinally spaced apart to provide a flexure zone extending along said flexure plate longitudinally between said regions, at least one of said bearing plates being longitudinally displaceable along said flexure plate by releasing said clamping means to selectively adjust the longitudinal length of said flexure zone whereby the resistance of said flexure plate to pivotal deflection of said platform is varied to establish an instrument operating range, and means operably connected to said platform for sensing and converting the deflection of said platform into an output signal.

14. A force measuring instrument comprising a base, a force-receiving platform spaced from said base, a flexure spring hinge yieldably pivotally mounting said platform on said base, and a dampening device for retarding pivotal deflection of said platform and comprising means rigid with said base and providing a cylinder, a piston slidably received in said cylinder, means for controllably supplying fluid to said cylinder on opposite sides of said piston, a piston rod rigid with said piston, a part on said rod, clamping means on said platform and engaging said part for transmitting the pivotal deflection of said platform to axially displace said piston against the pressure applied by the fluid in said cylinder, and coacting separably abuttable surface means on said part and said clamping means providing a substantially universal connection between said rod and said platform for maintaining alignment of said piston rod relative to said cylinder.

15. The force measuring instrument defined in claim 14 wherein said coacting surface means comprises oppositely facing segmental spherical surfaces formed on said part and engagingly clamped against relatively flat, opposed surfaces on said clamping means.

16. The force measuring instrument defined in claim 14 comprising a cylindrical member rigid with said piston and axially aligned with said rod, said piston rod and said cylindrical member extending from opposite facing surfaces of said piston through opposed end walls of said cylinder and providing said piston end surfaces with substantially equal areas exposed to the fluid in said cylinder.

17. The force measuring instrument defined in claim 14 wherein said means controllably supplying fluid to said cylinder comprises a fluid passage opening at opposite ends into said cylinder on opposite sides of said piston, and valve means comprising a manually manipulatable valve closure member disposed in said passage for controlling fluid flow therethrough in opposite directions.

18. The force measuring instrument defined in claim 17 wherein said valve closure member is rotatably seated in a portion of said passage and has an axially extending skirt formed with an axially recessed edge portion cut along a helix, said passage having a port disposed radially outwardly of said passage and communicating with the interior of said cylinder to one side of said piston, said skirt and the internal peripheral wall of said passage providing radially opposed coacting seating surfaces for controlling flow of fluid through said port.

19. The force measuring instrument defined in claim 18 wherein said valve closure member is rotatable about a longitudinal axis for varying the flow of fluid through said passage and wherein detent means are provided for releasably locking said valve member in angularly spaced apart positions.

20. A force measuring instrument comprising a base, a force-receiving platform spaced from said base, means yieldably pivotally mounting said platform on said base, and a dampening device for retarding pivotal deflection of said platform and comprising means rigid with said base and providing a cylinder, a piston slidably received in said cylinder, means providing a bypass fluid passage extending outwardly from the internal periphery of said cylinder and opening into said cylinder on opposite sides of said piston, manually manipulatable valve means having a valve member disposed in said passage for selectively controlling fluid flow therethrough in opposite directions, a piston rod rigid with said piston and axially extending freely through an end wall of said cylinder to provide a fluid flow clearance space therewith, means providing a fluid reservoir chamber exteriorly of said cylinder, said chamber being delimited by said end wall and being in fluid communication with the interior of said cylinder through said clearance space, and means operably connecting said piston rod to said platform for transmitting pivotal deflection of said platform to axially displace said piston against the pressure of the fluid in said cylinder.

21. The force measuring instrument defined in claim 20 wherein said means providing said chamber comprises a sealing diaphragm through which said piston rod extends, and wherein fluid passage means are formed in said piston rod for bleeding air from said chamber.

References Cited

UNITED STATES PATENTS

| | | |
|---|---|---|
| 2,124,968 | 7/1938 | Ahrndt et al. |
| 2,183,115 | 12/1939 | Boucher _____ 73—382 |
| 2,931,092 | 4/1960 | Humphrey _____ 29—149.5 |
| 3,080,936 | 3/1963 | Sher et al. _____ 177—229 X |
| 3,249,164 | 5/1966 | Seed _____ 177—225 |
| 3,279,246 | 10/1966 | Seasholtz _____ 173—141 |

JAMES J. GILL, *Primary Examiner.*

RICHARD C. QUEISSER, *Examiner.*

C. A. RUEHL, *Assistant Examiner.*